US012093978B2

(12) United States Patent
Vandusen et al.

(10) Patent No.: US 12,093,978 B2
(45) Date of Patent: *Sep. 17, 2024

(54) METHODS AND APPARATUS TO COLLECT AND PROCESS BROWSING HISTORY

(71) Applicant: THE NIELSEN COMPANY (US), LLC, New York, NY (US)

(72) Inventors: Teresa Vandusen, Richardson, TX (US); Achilleas Papakostas, Dallas, TX (US); Guy Syafoek, Tampa, FL (US); Denis Yastrebov, Nizhny Novgorod (RU); Dmitri Vasin, Nizhny Novgorod (RU)

(73) Assignee: The Nielsen Company (US), LLC, New York, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/535,346

(22) Filed: Nov. 24, 2021

(65) Prior Publication Data

US 2022/0084067 A1 Mar. 17, 2022

Related U.S. Application Data

(63) Continuation of application No. 15/402,868, filed on Jan. 10, 2017, now Pat. No. 11,188,941.

(30) Foreign Application Priority Data

Jun. 21, 2016 (RU) ................................ 2016124630

(51) Int. Cl.
*G06Q 30/00* (2023.01)
*G06F 16/957* (2019.01)
(Continued)

(52) U.S. Cl.
CPC ....... *G06Q 30/0255* (2013.01); *G06F 16/957* (2019.01); *H04L 67/535* (2022.05)

(58) Field of Classification Search
CPC .......................... G06Q 30/0255; H04L 67/535
See application file for complete search history.

(56) References Cited

U.S. PATENT DOCUMENTS 5,796,952 A 8/1998 Davis et al.
5,862,325 A 1/1999 Reed et al.
(Continued)

FOREIGN PATENT DOCUMENTS

WO WO-2014049828 A1 * 4/2014 ......... G06Q 30/0253

OTHER PUBLICATIONS

L.-T. Lv, L.-P. Chen and H.-F. Zhou, "An improved topic relevance algorithm for vertical search engines," 2008 International Conference on Wavelet Analysis and Pattern Recognition, Hong Kong, China, 2008, pp. 753-757, doi: 10.1109/ICWAPR.2008.4635878. (Year: 2008).*

(Continued)

*Primary Examiner* — Sun M Li

(57) ABSTRACT

Methods and apparatus to collect and process browsing history are disclosed. One disclosed method of collecting browsing history includes collecting a plurality of web requests, and for a web request in the plurality of web requests, determining a count indicating a number of other ones of the plurality of web requests that include a referrer identifying the web request. The method also includes when the count meets a threshold, indicating that the web request is a parent web request.

21 Claims, 5 Drawing Sheets

(51) Int. Cl.
  *G06Q 30/0251* (2023.01)
  *H04L 67/50* (2022.01)

(56) References Cited

U.S. PATENT DOCUMENTS

| | | | |
|---|---|---|---|
| 6,138,155 | A | 10/2000 | Davis et al. |
| 6,286,046 | B1 | 9/2001 | Bryant |
| 6,411,998 | B1 | 6/2002 | Bryant et al. |
| 6,611,835 | B1 | 8/2003 | Huang et al. |
| 6,708,215 | B1 | 3/2004 | Hingorani et al. |
| 6,763,386 | B2 | 7/2004 | Davis et al. |
| 6,851,060 | B1 | 2/2005 | Shrader |
| 6,873,610 | B1 | 3/2005 | Noever |
| 6,931,397 | B1 | 8/2005 | Sundaresan |
| 7,216,149 | B1 | 5/2007 | Briscoe et al. |
| 7,237,192 | B1 | 6/2007 | Stephenson et al. |
| 7,475,352 | B2 | 1/2009 | Yolleck et al. |
| 7,523,409 | B2 | 4/2009 | Yolleck et al. |
| 7,600,014 | B2 | 10/2009 | Russell et al. |
| 8,020,083 | B1 | 9/2011 | Kembel et al. |
| 8,028,059 | B1 | 9/2011 | OLaughlen et al. |
| 8,078,691 | B2 | 12/2011 | Zhang et al. |
| 8,191,007 | B1 | 5/2012 | Veloz, III |
| 8,452,273 | B1 | 5/2013 | Khomenko et al. |
| 8,499,065 | B2 | 7/2013 | Ross et al. |
| 8,682,904 | B1 | 3/2014 | Weber |
| 8,892,635 | B2 | 11/2014 | Sullivan et al. |
| 9,015,226 | B2 | 4/2015 | Sullivan et al. |
| 9,253,261 | B2 | 2/2016 | Weissblum |
| 9,332,056 | B2 | 5/2016 | Ross et al. |
| 11,188,941 | B2 | 11/2021 | Vandusen et al. |
| 2002/0038349 | A1 | 3/2002 | Perla et al. |
| 2002/0099818 | A1* | 7/2002 | Russell .......... H04L 67/02 709/224 |
| 2002/0120727 | A1 | 8/2002 | Curley et al. |
| 2002/0143933 | A1 | 10/2002 | Hind et al. |
| 2003/0070167 | A1 | 4/2003 | Holtz et al. |
| 2003/0131052 | A1 | 7/2003 | Allan |
| 2003/0187677 | A1 | 10/2003 | Malireddy et al. |
| 2003/0225858 | A1 | 12/2003 | Keohane et al. |
| 2005/0091510 | A1 | 4/2005 | McKeon et al. |
| 2006/0212792 | A1 | 9/2006 | White et al. |
| 2006/0265416 | A1 | 11/2006 | Seki et al. |
| 2007/0162448 | A1 | 7/2007 | Jain et al. |
| 2007/0260589 | A1* | 11/2007 | Yugami .......... G06F 11/3495 |
| 2007/0271375 | A1 | 11/2007 | Hwang |
| 2008/0005686 | A1 | 1/2008 | Singh |
| 2008/0046562 | A1 | 2/2008 | Butler |
| 2009/0083421 | A1* | 3/2009 | Glommen .......... G06Q 30/02 709/224 |
| 2009/0106769 | A1 | 4/2009 | Nakamura |
| 2009/0177768 | A1 | 7/2009 | Kind et al. |
| 2009/0271514 | A1 | 10/2009 | Thomas et al. |
| 2009/0327947 | A1 | 12/2009 | Schreiner et al. |
| 2009/0328063 | A1 | 12/2009 | Corvera et al. |
| 2010/0031153 | A1 | 2/2010 | Ortwein et al. |
| 2010/0077092 | A1 | 3/2010 | Akaboshi |
| 2010/0131835 | A1 | 5/2010 | Kumar et al. |
| 2010/0185940 | A1 | 7/2010 | Popp et al. |
| 2011/0041090 | A1 | 2/2011 | Seolas et al. |
| 2011/0078703 | A1 | 3/2011 | Dokovski et al. |
| 2011/0082984 | A1 | 4/2011 | Yuan |
| 2011/0119100 | A1 | 5/2011 | Ruhl et al. |
| 2011/0202888 | A1 | 8/2011 | Rusu et al. |
| 2011/0251902 | A1 | 10/2011 | Nagarajayya |
| 2012/0030338 | A1 | 2/2012 | Zhang et al. |
| 2012/0059696 | A1 | 3/2012 | Theberge et al. |
| 2012/0066378 | A1 | 3/2012 | Lui et al. |
| 2012/0078707 | A1 | 3/2012 | Ramakrishnan et al. |
| 2012/0084133 | A1 | 4/2012 | Ross et al. |
| 2012/0102418 | A1 | 4/2012 | Joy et al. |
| 2012/0129544 | A1 | 5/2012 | Hodis et al. |
| 2012/0179743 | A1 | 7/2012 | Sullivan et al. |
| 2014/0019589 | A1 | 1/2014 | Ross et al. |
| 2014/0068411 | A1 | 3/2014 | Ross et al. |
| 2015/0294019 | A1* | 10/2015 | Chakra .......... G06F 16/955 707/754 |
| 2017/0364949 | A1 | 12/2017 | Vandusen et al. |
| 2020/0067861 | A1* | 2/2020 | Leddy .......... G06F 21/6245 |

OTHER PUBLICATIONS

C. Fang, J. Liu and Z. Lei, "Fine-Grained HTTP Web Traffic Analysis Based on Large-Scale Mobile Datasets," in IEEE Access, vol. 4, pp. 4364-4373, 2016, doi: 10.1109/ACCESS.2016.2597538. (Year: 2016).*

"Discovering empirical laws of Web dynamics", by K. Saito and P. Langley, Proceedings 2002 Symposium on Applications and the Internet (SAINT 2002), 2002, pp. 168-175, doi: 10.1109/SAINT.2002.994474. (Year: 2002).*

G. Ruffo, R. Schifanella, M. Sereno and R. Politi, "WALTy: a user behavior tailored tool for evaluating Web application performance," Third IEEE Intl Symposium on Network Computing and Applications, 2004. (NCA 2004). Proceedings., Cambridge, MA, USA, 2004, pp. 77-86, doi: 10.1109/NCA.2004.1347765 (Year: 2004).*

Fielding et al., "Hypertext Transfer Protocol—HTTP/1.1", RFC 2616, http://www.w3.org/Protocols/rfc2616/rfc2616-sec14.html, last retrieved on Feb. 23, 2017, 30 pages.

United States Patent and Trademark Office, "Non-Final Office Action," issued in connection with U.S. Appl. No. 12/895,288, mailed on Jul. 5, 2012, 11 pages.

United States Patent and Trademark Office, "Notice of Allowance," issued in connection with U.S. Appl. No. 12/895,288, mailed on Mar. 29, 2013, 9 pages.

United States Patent and Trademark Office, "Restriction Requirement", issued in connection with U.S. Appl. No. 13/953,176, mailed on Aug. 22, 2014, 6 pages.

United States Patent and Trademark Office, "Non-Final Office Action", issued in connection with U.S. Appl. No. 13/953,176, mailed on Nov. 6, 2014, 6 pages.

United States Patent and Trademark Office, "Non-Final Office Action," issued in connection with U.S. Appl. No. 13/630,818, mailed on Nov. 24, 2014, 23 pages.

United States Patent and Trademark Office, "Final Office Action", issued in connection with U.S. Appl. No. 13/630,818, dated Apr. 9, 2015, 29 pages.

United States Patent and Trademark Office, "Non-Final Office Action", issued in connection with U.S. Appl. No. 13/630,818, mailed on Sep. 16, 2015, 43 pages.

United States Patent and Trademark Office, "Non-Final Office Action", issued in connection with U.S. Appl. No. 13/953,176, mailed on Jun. 29, 2015, 6 pages.

United States Patent and Trademark Office, "Final Office Action", issued in connection with U.S. Appl. No. 13/630,818, issued on Mar. 14, 2016, 52 pages.

United States Patent and Trademark Office, "Notice of Allowance", issued in connection with U.S. Appl. No. 13/953,176, mailed on Dec. 30, 2015, 8 pages.

United States Patent and Trademark Office, "Advisory Action", issued in connection with U.S. Appl. No. 13/630,818, mailed on Jun. 29, 2016, 4 pages.

United States Patent and Trademark Office, "Non-Final Office Action", issued in connection with U.S. Appl. No. 13/630,818, mailed on Sep. 23, 2016, 52 pages.

United States Patent and Trademark Office, "Final Office Action," issued in connection with U.S. Appl. No. 13/630,818, mailed on Apr. 4, 2017, 57 pages.

United States Patent and Trademark Office, "Non-Final Office Action," issued in connection with U.S. Appl. No. 15/402,868, mailed on Mar. 20, 2020, 18 pages.

United States Patent and Trademark Office, "Final Office Action," issued in connection with U.S. Appl. No. 15/402,868, mailed on Aug. 14, 2020, 30 pages.

United States Patent and Trademark Office, "Non-Final Office Action," issued in connection with U.S. Appl. No. 15/402,868, mailed on Feb. 19, 2021, 33 pages.

(56) References Cited

OTHER PUBLICATIONS

United States Patent and Trademark Office, "Notice of Allowance and Fee(s) Due," issued in connection with U.S. Appl. No. 15/402,868, mailed on Jul. 21, 2021, 13 pages.
United States Patent and Trademark Office, "Corrected Notice of Allowability," issued in connection with U.S. Appl. No. 15/402,868, mailed on Jul. 27, 2021, 10 pages.

* cited by examiner

METHODS AND APPARATUS TO COLLECT AND PROCESS BROWSING HISTORY

CROSS-REFERENCE TO RELATED APPLICATIONS

This patent is continuation of U.S. patent application Ser. No. 15/402,868, (now U.S. Pat. No. 11,188,941), which was filed on Jan. 10, 2017, and which claims priority to Russian Patent Application No. 2016124630, which was filed on Jun. 21, 2016. U.S. patent application Ser. No. 15/402,868, and Russian Patent Application No. 2016124630 are hereby incorporated herein by reference in their entireties.

FIELD OF THE DISCLOSURE

This disclosure relates generally to browser history collection, and, more particularly, to methods and apparatus to collect and process browsing history.

BACKGROUND

Entities that advertise their products or services on the Internet, advertising agencies, etc. have an interest in determining how users are exposed to (e.g., consume) advertisements, which are, for example, located on Internet websites and referenced via Hypertext transport protocol (HTTP) requests. Audience monitoring can be achieved in a number of ways. For example, monitoring can be performed at the client-side to monitor user activities. Alternatively, monitoring can be performed at the server-side to track and/or count served webpages.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
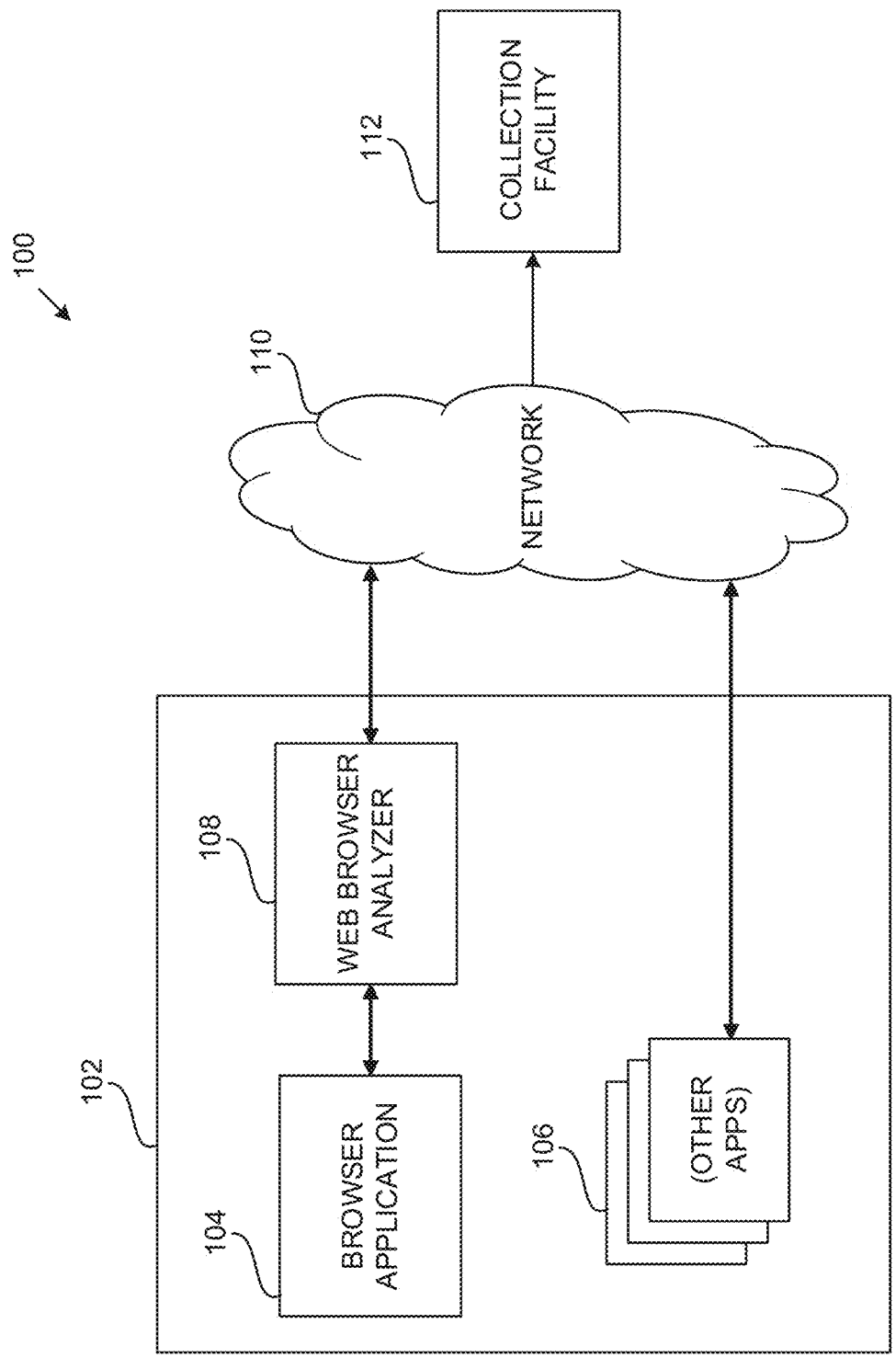
FIG. 1 is a block diagram illustrating an example environment, in which an example web browsing data collection may operate to collect browsing history of an example hardware device platform as disclosed herein.

Methods and apparatus to collect and process browsing history are disclosed herein. Network monitoring is used to determine how users/consumers are exposed to advertising. Network monitoring can be accomplished by monitoring activity related to a web browser and/or accessing a browsing history from the web browser. However, web browser information (e.g., web browser histories) may not always be accessible (e.g., due to restrictions imposed by an operating system, encryption of history information, etc.).

Typically, when a web browser installed on a client device (e.g., a computing device such as a desktop computer, a laptop computer, or a portable device, etc.) requests a webpage (e.g., after a user inputs a request for www.samplewebpage.com/news/index.htm), the browser will receive a response (e.g., from a web server) that includes a webpage (e.g., a hyper-text markup language (HTML) webpage). The webpage typically includes references to many other elements (e.g., images, videos, other webpages (e.g., in an IFRAME), etc.). As the browser processes the references, the browser transmits requests (e.g., HTTP requests) to the web server (or another web server) for the elements and receives responses that include the elements.

Most browsers keep a history of the webpages that were requested. Often such a history does not identify the individual elements of the webpages (e.g., the browser history would record that www.samplewebpage.com/news/index.htm was visited and would not record the individual requests for elements (e.g., images on the webpage) of index.htm in the browser history). In some audience measurement systems, the browser history is collected and analyzed (e.g., transmitted to an audience measurement entity for analysis). However, in some instances, it may not be desirable or even possible to collect the browser history. For example, some mobile devices do not allow audience measurement entity metering software to access the browser history.

Methods and apparatus disclosed herein create a history of webpage browsing that may be similar to the browser history collected by a browser. Some disclosed examples collect requests transmitted by a browser and responses received by the browser. In such examples, the requests and the responses include the requests/responses for the initial webpage (sometimes referred to as the parent webpage) and the requests/responses for the elements of the webpage (sometimes referred to as child elements). Thus, collecting the requests/responses does not provide a record of the requested webpages (e.g., a record of the parent webpages).

In examples disclosed herein, a browser history is generated without directly accessing information and/or application files associated with a browser application (e.g., a stored browser history of a computing device). In some disclosed examples, web requests/responses (e.g., webpage request, HTTP requests, requests/responses collected by a virtual private networking server, requests/responses collected by a proxy server, requests/responses collected by a packet capture, entries in the "ACCEPT" headers of HTTP requests, etc.) are collected and transformed the into a history of the web requests (e.g., the parent requests). In some examples, the web requests are analyzed to determine, for each web request, a number of other web requests that include a reference (e.g., an HTTP REFFERER field, usually referred to as a REFERER (sic) field) that identifies a webpage associated with the analyzed web request (e.g., identifies a webpage that caused to a web browser to retrieve the webpage or element identified in the analyzed webpage request). The number of references associated with each web request is determined. The number of references for each web request is compared to a threshold. When the number of references exceeds or meets the threshold, the webpage associated with the web request that meets or exceeds the threshold may be determined to be identified (e.g., may be identified as a candidate parent, may be inserted into a generated browsing history, may be transmitted to a collection facility, etc.).

In some examples, further analysis and/or filtering of the candidate parent(s) may be performed. For example, the number of references for a candidate parent may be compared to the number of references for other candidate parents (e.g., number of references may be compared to the root mean square of the number of references from all other candidate parents and/or other web requests) to further filter the list of candidate parents down to the candidate parents that are expected to be webpages that were requested by a user (e.g., by a typing a URL, by selecting a hyperlink, etc.).

FIG. 1 is a block diagram of an example environment 100 in which an example web browsing data collection system may operate to collect web browsing history of an example hardware device platform 102 as disclosed herein. The example environment 100 includes the example hardware device platform 102, which includes an example web browser application 104, example other application(s) 106 and an example web browser analyzer 108 (e.g., an on-device meter). The example environment 100 also includes an example network 110 and an example collection facility 112.

The example hardware device platform 102 may be a desktop computer, a laptop, a portable device (e.g., a tablet or cell phone), or a distributed computing system (e.g., a collection of computing devices that run web browsers). In this example, a processor of the hardware device platform 102 executes the web browser application 104 in parallel with the web browser analyzer 108 and/or the other application(s) 106. While the illustrated example of FIG. 1 includes a single hardware device platform 102, any number of hardware device platforms 102 may be present in the environment 100. For example, the example collection facility 112 may collect analyzed data from many hardware device platforms 102 that are associated with many users to generate statistical reports that reflect exposure of a total audience to webpages or other needs.

The web browser application 104 of the illustrated example is an application running on the example hardware device platform 102. In particular, the example web browser application 104 is operated to access webpages via the network 110. However, the example web browser application 104 may be any application (e.g., an application that utilizes HTTP requests but does not generally function as a web browsing application) or portal used to access the network 110. For example, the web browser application 104 may be an application used to retrieve sports scores, an application that presents videos, etc.).

The other applications(s) 106 of the illustrated example run on the hardware device platform 102. In particular the other application(s) 106 of the illustrated example run in parallel with the web browser application 104 (e.g., in a multithreaded computing environment of the hardware device platform 102). According to the illustrated example, the other application(s) 106 access the network 110 directly. However, in other examples, the other application(s) 106 may access the network 110 via the web browser analyzer 108. In such examples, the web browser analyzer 108 may also analyze HTTP requests/traffic from at least a portion of the other application(s) 106.

The web browser analyzer 108 of the illustrated example is a program/process/application that runs on the hardware device platform 102. For example, the web browser analyzer 108 runs in parallel with the web browser application 104 and/or the other application(s) 106. Alternatively, the web browser analyzer 108 may be executed and/or located with any other device. For example, the web browser analyzer 108 may be a stand-alone device that is connected to the example network 110 and located at the same location as the example collection facility 112, or any other location.

The example web browser analyzer 108 of FIG. 1 is implemented as a virtual private network (VPN) server (e.g., an on-device VPN server, a mobile device VPN server, etc.). According to the illustrated example, the web browser analyzer 108 logs HTTP data from the web browser application 104 and forwards the HTTP data to the network 110, collection facility 112 by using a data packet analyzer in which HTTP data is parsed and/or transmission control protocol (TCP) streams are re-assembled. According to the illustrated example, the TCP streams are reassembled and analyzed at the example web browser analyzer 108 executing on the hardware device platform 102. Alternatively, the TCP streams may be forwarded to the network 110 and/or the data collection facility 112 for analysis. The TCP streams may use protocols such as IPv4, IPv6, or any other appropriate protocol. While the web browser analyzer 108 is a VPN server that collects packets and analyzes them to generate a list of webpage requests and/or responses, the web browser analyzer 108 may alternatively be implemented by any software and/or device that determines web requests sent by the browser application 106 and/or the other application(s) 106. For example, the web browser analyzer 108 may be a packet sniffer, a proxy server, a router, a network switch, an application or device with a programming interface to the web browser application 104 and/or the hardware device platform 102, etc.

The network 110 of the illustrated example is the internet. Alternatively, the network 110 may be a wireless network, a wired network, a TCP/IP network, a wide access network (WAN), a local access network (LAN), or any appropriate combination of the aforementioned or other network types.

The collection facility 112 of the illustrated example is communicatively coupled to the example hardware device platform 102 (and thereby the web browser analyzer 108) via the network 110 to collect data (e.g., browsing data for collected advertising analysis purposes) from multiple ones of the hardware device platforms 102. In this example, the collection facility 112 consists of one or more servers to collect, aggregate and/or analyze the data collected from the multiple hardware device platforms (e.g., to generate reports of webpage exposure, etc.).

In operation, to collect browsing information of the hardware device platform 102, the web browser analyzer 108 of the illustrated example acts as an intermediary between the web browser application 104 and the network 110 (e.g., web servers are accessible via the network 110), as will be discussed in greater detail below in connection with FIG. 2. In particular, the example web browser analyzer 108 of FIG. 1 monitors browser requests from the example web browser application 104 to generate a browsing history (e.g., a browsing history of webpages requested by a user of the example hardware device platform 102). To generate the browser history that represents a webpage requested by a user (e.g., to filter web elements that form the webpages requested by the user (such as images, videos, scripts, etc.)), the web browser analyzer 108 counts the number of references identifying each web request (e.g., counts the number of other web requests that include a REFERER filed that identifies the web request). The web browser analyzer 108 compares the number of references to one or more thresholds or other metrics to determine if the web request is determined to be a web request for a requested webpage or, alternatively, a request for a child element. The browsing history information (e.g., the webpages identified as parent webpages) is then provided/forwarded to the collection facility 112.

Figure 2:
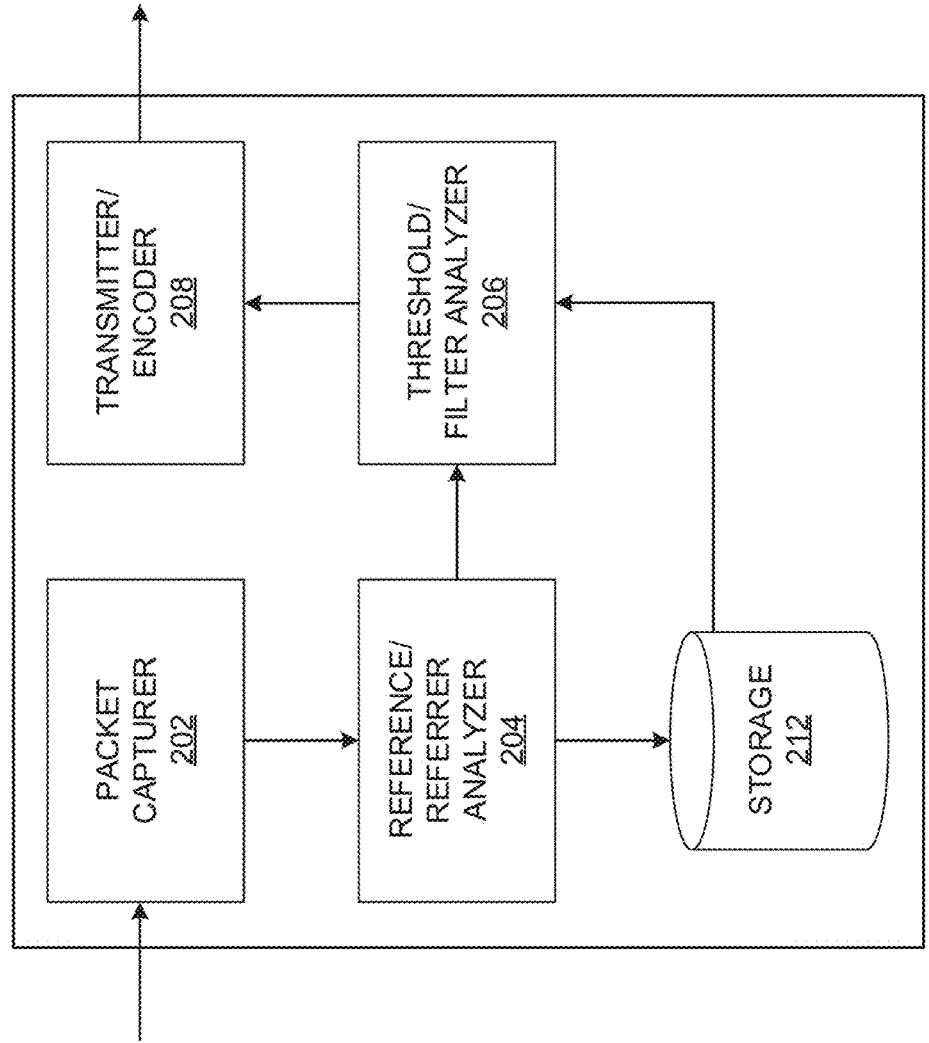
FIG. 2 is a block diagram of an example implementation of the example web browser analyzer of FIG. 1 in accordance with the teachings of this disclosure.

FIG. 2 is a block diagram of an example implementation of the example web browser analyzer 108 of FIG. 1 in accordance with the teachings of this disclosure. The web browser analyzer 108 of the illustrated example includes an example packet capturer 202, an example reference/referrer analyzer 204, an example threshold/filter analyzer 206 and an example transmitter/encoder 208. The example web browser analyzer 108 also includes a storage 212 (e.g., a database, a buffer, a cache, file, etc.).

The packet capturer 202 of the illustrated example receives web traffic (e.g., HTTP requests, HTML files, webpage data, packets and/or web data files/requests) related to the web browser application 104 of FIG. 1. Additionally or alternatively, the packet capturer 202 may receive traffic from any other application or device. In this example, the packet capturer 202 receives web request data from the web browser application 104. The example packet capturer 202 forwards received data to the example reference/referrer analyzer 204.

The reference/referrer analyzer 204 of the illustrated example processes web requests received from the example packet capturer 202 to determine if at least one of the plurality of web requests (e.g., a collection of web requests) may be a candidate parent (e.g., a parent webpage requested by a user). In some examples, the reference/referrer analyzer 204 stores at least some of the web requests and/or candidate parent(s) in the example storage 212. For example, the reference/referrer analyzer extracts web requests (e.g., from HTTP traffic, from data transmitted and/or received the web browser application 104 and/or the other application(s) 106, etc.) and processes the web requests to determine referrer counts corresponding to the web requests (e.g., associated webpages). The example packet capturer 202, in turn, forwards the referrer counts to the example threshold/filter analyzer 206 after determining the referrer counts. In this illustrated example, the packet capturer 202 forwards the referrer counts with respective candidate parents. In particular, the web requests are denoted as candidate parents in this example when they are forwarded to the threshold/filter analyzer 206 along with the referrer counts. An example of how a referrer ("Referer" (sic)) is embedded in HTML code of a web request is seen in Table 1 below:

TABLE 1

GET /images/header.gif
Accept: image/gif, image/jpeg, */*
Referer: http://www.webserver.com/homepage.html
Accept-Language: en-us
Accept-Encoding: gzip, deflate
User-Agent: Mozilla/4.0 (compatible; MSIE 6.0; Windows NT 5.1)
Host: webserver.com:80
Connection: Keep-Alive The threshold/filter analyzer 206 of the illustrated example filters the candidate parent(s) and/or further analyzes the candidate parent(s) to determine a final list (e.g., array) of parents (e.g., winner parents). In this example, the threshold/filter analyzer 206 sorts and/or discards the candidate parent(s). According to the illustrated example, the threshold/filter analyzer 206 compares the referrer counts associated with the candidate parent(s) to a threshold. The example threshold/filter analyzer forwards the candidate parent(s) that have respective referrer counts that meet or exceed the threshold. Accordingly, in this example, the candidate parent(s) that do not have respective referer counts that meet or exceed the threshold are discarded.

The transmitter/encoder 208 of the illustrated example transmits data including the final list of parents to the collection facility 112 via the network 110. In this example, the transmitter/encoder 208 acts as an encoding device that transmits the final list of parents (e.g., encapsulated as packets) to the network 110.

In this example, the storage 212 is a storage device for (at least temporarily) storing the candidate parent(s), winner parents, and/or any associated arrays of the candidate parent(s). In particular, the storage 212 may store candidate parent(s) and/or web requests (e.g., from the packet capturer 202). The storage 212 may be implemented as non-volatile random access memory (NVRAM), flash memory, a buffer, a cache, a file and/or a storage device such as a hard drive or other storage media, etc.

While an example manner of implementing the example web browser analyzer 108 of FIG. 1 is illustrated in FIG. 2, one or more of the elements, processes and/or devices illustrated in FIG. 2 may be combined, divided, re-arranged, omitted, eliminated and/or implemented in any other way. Further, the example packet capturer 202, the example reference/referrer analyzer 204, the example threshold/filter analyzer 206, the example transmitter/encoder 208, the example storage 212 and/or, more generally, the example web browser analyzer 108 of FIG. 1 may be implemented by hardware, software, firmware and/or any combination of hardware, software and/or firmware. Thus, for example, any of the example packet capturer 202, the example reference/referrer analyzer 204, the example threshold/filter analyzer 206, the example transmitter/encoder 208, the example storage 212 and/or, more generally, the example web browser analyzer 108 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, packet capturer 202, the example reference/referrer analyzer 204, the example threshold/filter analyzer 206, the example transmitter/encoder 208, and/or the example storage 212 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example web browser analyzer 108 of FIG. 1 may include one or more elements, processes and/or devices in addition to, or instead of, those illustrated in FIG. 2, and/or may include more than one of any or all of the illustrated elements, processes and devices.

Figure 3:
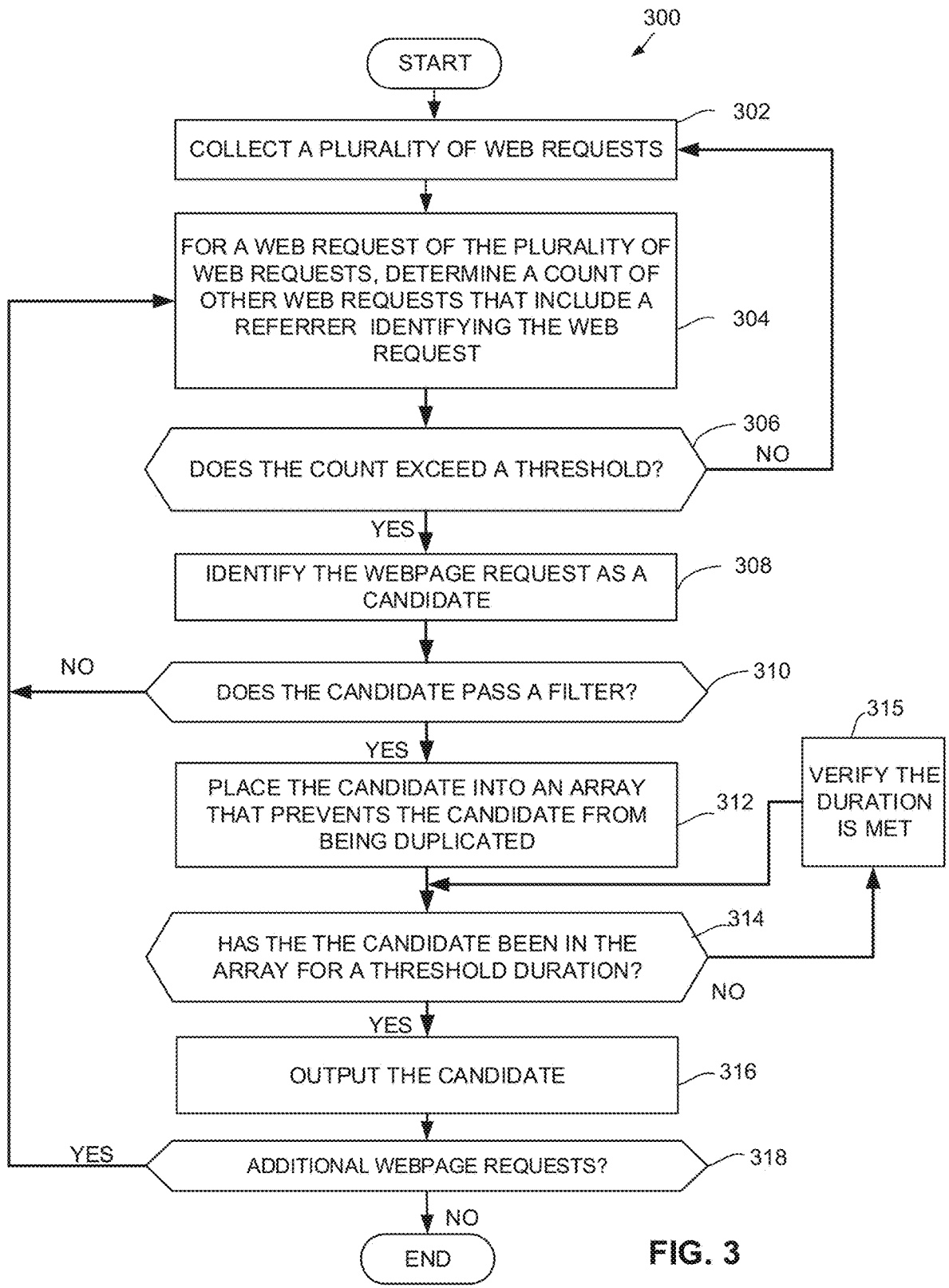
FIG. 3 is a flowchart representative of example machine readable instructions for implementing the example web browser analyzer of FIG. 2.

A flowchart representative of example machine readable instructions that may be executed implement the example web browser analyzer 108 of FIG. 1 and/or FIG. 2 is shown in FIG. 3. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example web browser analyzer 108 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example process 300 of FIG. 3 begins when the example hardware device platform 102 (e.g., a mobile phone, tablet, a computer, a laptop, a distributed computing system, desktop computer etc.) is used to browse webpage(s) using the web browser application 104. In the illustrated example, access to the browser history of the web browser application 104 is prevented.

The example packet capturer 202 captures/collects a plurality of web requests (e.g., 10, 20, 50, 100, etc. web requests) that are transmitted by the example web browser application 104 (block 302). In particular, the web requests collected by the packet capturer 202 are related to the multiple webpages accessed on the web browser application 104 of the hardware device platform 102 (e.g., accessed within a defined time duration and/or a pattern of activity such as multiple web requests of the web browser application 104). In this example, a number of the collected web requests is based on a defined number (e.g., only 10, 20, 30, 40 . . . collected web requests are stored, etc.). For example, according to the illustrated example, 20 web requests are collected by the packet capturer 202 during a specific time period/time step. In this example, a VPN server of the web browser analyzer 108 is used to collect web requests/HTTP requests from the web browser application 104.

For a web request of the plurality of web requests, the example reference/referrer analyzer 204 determines a number (e.g., a count) of other web requests that include a referrer identifying the web request (block 304). In some examples, the referrer counting is performed by the example reference/referrer analyzer 204 iterating (e.g., sequentially iterating) through the stored web requests. In other examples, each of the web requests are analyzed to determine referrer counts in parallel (e.g., a multithreaded operation). For example, referrer counts of each of the webpage responses may be determined after the web requests and/or HTTP requests are parsed out to separate reference/referrer analyzers 204 via separate buffers/caches. Additionally or alternatively, the example reference/referrer analyzer 204 performs an ongoing count of referrer counts (e.g., using counters associated with each request).

Next, in this example, the threshold/filter analyzer 206 determines whether the referrer count/number of a web request (and associated webpage) meets or exceeds a threshold (block 306). In particular, the threshold/filter analyzer 206 compares the number of Referer fields of web requests that refer to the web request to a threshold. The threshold may be periodically refined based on incoming collections of web requests (e.g., the threshold may be increased or decreased). According to the illustrated example, the referrer count may be compared to a root mean square of the other referrer counts corresponding to other web requests (e.g., other web requests of a collected group of web requests). An example of this determination is described in greater detail below in connection with FIG. 4. In some other examples, the threshold is additionally or alternatively a numerical value (e.g., a constant numerical value such as 5, 10, 15, etc.). If the web request does not meet or exceed the threshold (block 306), the process returns control to block 304 to process a next web request, otherwise the process proceeds to block 308.

When the threshold/filter analyzer 206 determines that the number of referrers referring to the web request meets the threshold (block 306), the corresponding web request and/or a webpage associated with the corresponding web request is deemed a candidate (e.g., a candidate parent) (block 308).

In some examples, the threshold/filter analyzer 206 determines whether the candidate passes a filter (block 310). For example, the candidate may be filtered by the threshold/filter analyzer 206 to remove certain web request types such as IFRAMES, pop-up windows, and/or known advertising, etc. that are requested by the web browser application 104, for example. Additionally or alternatively, the web requests are filtered by the threshold/filter analyzer 206 prior to the reference/referrer analyzer 204 determining whether any of the plurality of web requests are a candidate. In some examples, the candidate is filtered by the threshold/filter analyzer 206 against a blacklist (e.g., a list of web requests, domain names and/or webpages to be filtered out of consideration). Additionally or alternatively, the candidate may be filtered by the threshold/filter analyzer 206 based on certain types of web requests (e.g., an HTML frame request, an in-page request, a script, a cascading style sheet (CSS) request, a ping and/or pop-up request, etc.). If the candidate passes the filter (block 310), the process proceeds to block 312. Otherwise, control of the process returns to block 304 to process a next web request, for example.

In this example, the threshold/filter analyzer 206 places the candidate into an array (e.g., a data array) after the candidate has passed the filter performed by the threshold/filter analyzer 206 (block 312). In particular, the array of the illustrated example prevents a duplicate finding of the candidate during a defined time duration (e.g., 2 seconds, 20 seconds, 200 seconds, etc.). In some examples, the array is stored in the example storage 212.

The example threshold/filter analyzer 206 of the illustrated example determines if the at least one candidate has been kept in the array for a specific duration and/or time threshold (block 314). For example, the packet capturer 202 may provide newer candidate(s) to replace the candidate and/or other candidates in the array (e.g., temporarily stored in the storage 212) during this specific time duration. If it is determined that the candidate has not been in the array for the specific time duration (block 314), the process verifies that the time duration (block 315) has been met and the process returns control to the block 314. Otherwise, the process proceeds to block 316.

After the time duration has been met (block 315), the transmitter/encoder 208 outputs the candidate to the collection facility 112 via the network 110 for further analysis and/or data aggregation (block 316). Additionally or alternatively, the transmitter/encoder 208 provides a webpage and/or a URL associated with the candidate as an output. In some examples, the web request is transmitted as an encapsulated data packet identifying the web request as an entry for the final list (e.g., a winner web request).

In some examples, the process 300 of FIG. 3 may repeat upon a need to process other web requests, new subsequent browser activity and/or additional web requests to be processed. In this example, the packet capturer 202 determines whether the process is to be repeated for other web requests (e.g., based on a number or characteristic of incoming web requests from the web browser application 104) (block 318) and if the web browser analyzer 108 determines that the process is to be repeated (block 318), control returns to block 304. Otherwise, the process ends. In some examples, whether the process ends is determined based on how many web requests are to be analyzed by the reference/referrer analyzer 204. In particular, one of the web requests may be selected at a time by the packet capturer 202 and/or the reference/referrer analyzer 204 to determine respective referrer counts, and when the web requests (e.g., stored web requests in the storage 212) are analyzed for referrer counts, the process ends. Additionally or alternatively, the process repeats based on collecting a new set of a plurality of web requests and/or a subsequent web request.

Figure 4:
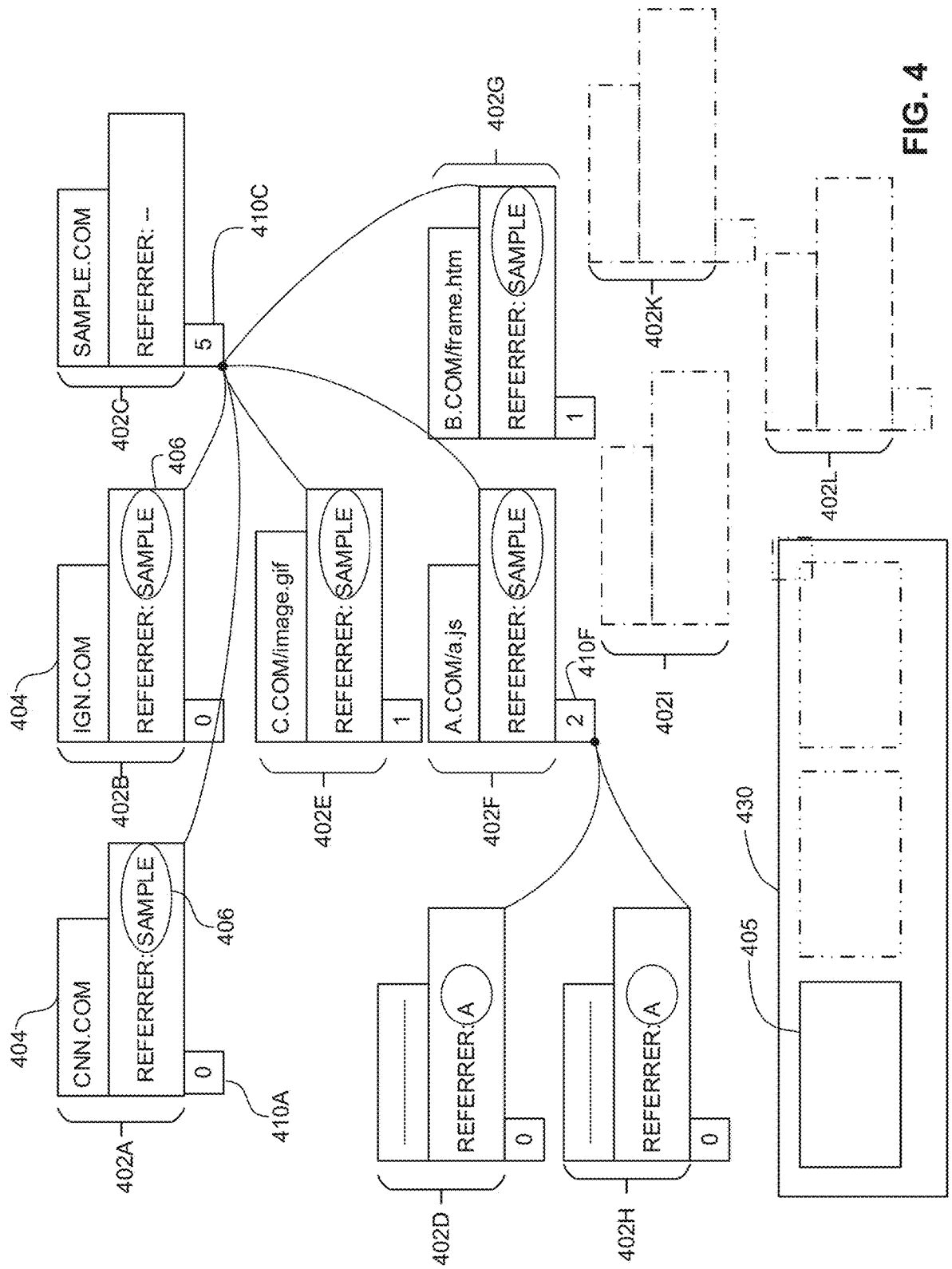
FIG. 4 is a schematic overview to illustrate an example operation of the example web browser analyzer of FIG. 1 and/or FIG. 2.

FIG. 4 is a schematic overview illustrating a result of the example process 300 of FIG. 3. More specifically, the example of FIG. 4 corresponds to a specific time period (e.g., a time period where a specific number of web requests are collected) and/or time step of the example method 300 of FIG. 3. At this time period, numerous example web page requests 402A-402L have been stored (e.g., stored in the example storage 212). In this example, the number of collected web requests defines when the example process is initiated. Each of the example web requests 402 has a corresponding webpage element 404 and/or webpage (e.g., a webpage or other resource such as an image) that was accessed as well as a corresponding referrer 406. In this example, the example web request 402C corresponds to a request for the default webpage from the domain sample-.com. In this example, a total number of 10 web requests 402A-402L are captured as a collection.

As can be seen in the example of FIG. 4, the example web request 402C has a corresponding total referrer count 410C of 5 other referrers from the other web page requests 402A, 402B, 402E, 402F and 402G. Similarly, the example web request 402F for A.com/a.js has a total referrer count 410F of 2 referrers (from the example webpage requests 402D and 402H) while the example web request 402G for B.com/frame.html and the example web request 402E for C.com/image.gif each have one referrer. In this example, a web request and/or a webpage associated with the web request are deemed to be a candidate if their associated referrer count exceeds (or meets) a threshold of 4 the calculated root mean square of referrer counts of the other collected web requests (e.g., currently collected web requests of this timeframe) with their respective webpages. Within a given collection, a plurality of candidates may be determined (e.g., by the reference/referrer analyzer 204). In the example calculation of Equation 1, which may be performed by the example threshold/filter analyzer 206, is shown below:

$$\text{Referrers for the web request } 204 = \qquad (1)$$
$$5 > \sqrt{2^2 + 1^2 + 1^2 + 1^2} = 2.645$$

Because the referrer count 410C of the web request 402C (5) exceeds the threshold of four and the root mean square of the other referrer counts (2.645), the web request 402C of the illustrated example is deemed a candidate parent. In some examples, a web request may be deemed a parent if the number of referrers meets or exceed the threshold or root mean square.

Because the example web request 402C has been deemed a candidate, the example web request 402C of the illustrated example and/or its respective associated website (sample-.com) is placed into an example array 430, which may be stored in the example storage 212. The array 430 of the illustrated example prevents the web request 402C and/or its respective website from being duplicated within the array 430. In some examples, the web request 402C is filtered by the threshold/filter analyzer 206 prior to being placed within the array 430. In some examples, the web request 402C is replaced within the array 430 by a subsequent web request with a higher number of referrers. In some examples, the web request 402C is held in the array 430 until a defined time duration after the latest record/candidate is received (e.g., 10 seconds). In some examples, candidates within the array 430 are eventually discarded (e.g., pushed out based on the time placed in the array 430) after a defined time duration.

Figure 5:
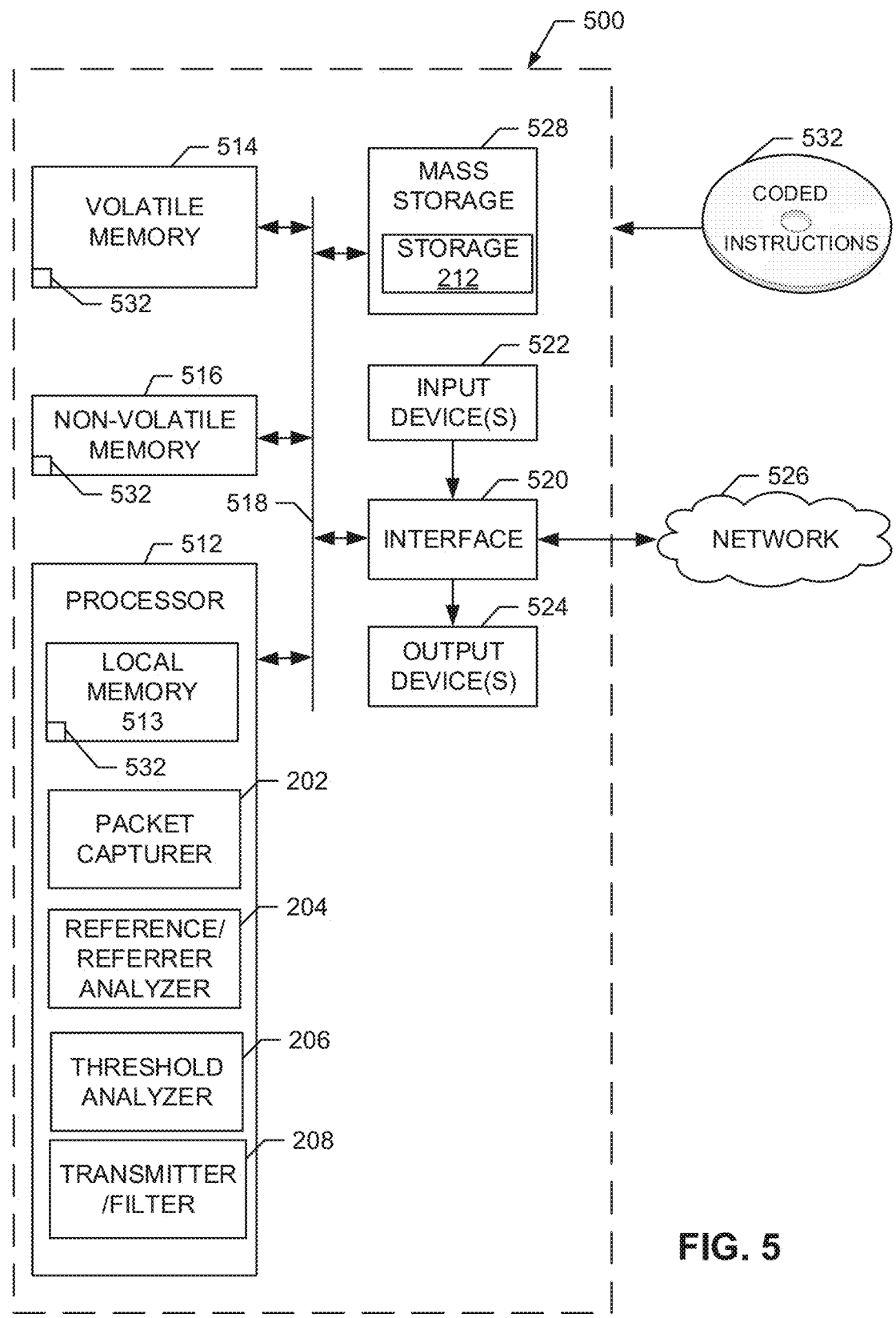
FIG. 5 is a block diagram of an example processor platform capable of executing machine readable instructions to implement the process of FIG. 3.

FIG. 5 is a block diagram of an example processor platform 500 capable of executing the instructions of FIG. 3 to implement the web browser analyzer 108 of FIGS. 1 and 2. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). In this example, the processor 512 also includes the example packet capturer 202, the example reference/referrer analyzer 204, the example threshold/filter analyzer 206 and the example transmitter/encoder 208. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 3 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture enable an efficient manner of determining and/or generating a browser history (e.g., a browser history of a portable device) without accessing browser information (e.g., browser data files, browser histories, etc.).

This patent claims priority to Russian Patent Application No. 2016124630, which was filed on Jun. 21, 2016. The foregoing Russian Patent Application is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement system comprising:
at least one processor; and
at least one memory having stored therein computer readable instructions that, when executed by the at least one processor, cause the audience measurement system to perform operations comprising:
logging Hypertext Transfer Protocol (HTTP) data associated with a plurality of web requests associated with a web browser application, wherein the HTTP data indicates, for each of at least some of the plurality of web requests, a referrer corresponding to the web request;
storing the HTTP data associated with the plurality of web requests for a defined time duration, wherein the HTTP data associated with the plurality of web requests is discarded upon expiration of the defined time duration;
determining, for each one of the plurality of web requests, a number of referrers corresponding to a count of others of the plurality of web requests for which the referrer is the one of the plurality of web requests based on the HTTP data;
determining an adaptive referrer threshold for the plurality of web requests based on the numbers of referrers of the plurality of web requests;
determining that a given web request of the plurality of web requests has a number of referrers that exceeds the adaptive referrer threshold;
identifying the given web request as a parent web request based on determining that the number of referrers of the given web request exceeds the adaptive referrer threshold; and
providing a uniform resource locator (URL) of the parent web request.

2. The audience measurement system of claim 1, wherein the operations further include filtering an additional given web request of the plurality of web requests that has a number of referrers that exceeds the adaptive referrer threshold.

3. The audience measurement system of claim 2, wherein the operations further include filtering the additional given web request based on detecting at least one of an in-page request, a script, a cascading style sheet (CSS) request, or a ping.

4. The audience measurement system of claim 1, wherein the operations further include:
identifying a set of ones of the web requests having numbers of referrers that exceed the adaptive referrer threshold; and
updating the set based on later incoming web requests having a greater number of referrers than the given web request.

5. The audience measurement system of claim 1, wherein the operations further include discarding HTTP data associated with a web request of the plurality of web requests that has a number of referrers that does not exceed the adaptive referrer threshold.

6. The audience measurement system of claim 1, wherein the web browser application is executed on a first thread of the at least one processor, and wherein the computer readable instructions are executed on a second thread different from the first thread.

7. The audience measurement system of claim 6, wherein the at least one processor includes a first processor and a second processor separate from the first processor, the first thread is executed on the first processor, and wherein the second thread is executed on the second processor.

8. A method of determining browsing history of a web browser application, the method comprising:
  logging, by executing instructions with at least one processor, Hypertext Transfer Protocol (HTTP) HTTP data associated with a plurality of web requests associated with the web browser application, wherein the HTTP data indicates, for each of at least some of the plurality of web requests, a referrer corresponding to the web request;
  storing, by executing instructions with the at least one processor, the HTTP data associated with the plurality of web requests for a defined time duration, wherein the HTTP data associated with the plurality of web requests is discarded upon expiration of the defined time duration;
  for each of at least some of the plurality of web requests, determining, by executing instructions with the at least one processor, a count of referrers indicating a number of other ones of the plurality of web requests for which the referrer indicated by the HTTP data identifies the web request;
  determining an adaptive referrer threshold for the plurality of web requests based on the counts of referrers of the at least some of the plurality of web requests; and
  in response to the count of referrers of a given web request exceeding the adaptive referrer-a threshold, providing, by executing instructions with the at least one processor, a uniform resource locator (URL) of the given web request.

9. The method of claim 8, further including filtering, by executing instructions with the at least one processor, an additional given web request of the plurality of web requests having a count of referrers that exceeds the adaptive referrer threshold.

10. The method of claim 9, wherein the filtering of the additional given web request-requests is based on detecting-detection of at least one of an in-page request, a script, a cascading style sheet (CSS), or a ping.

11. The method of claim 8, further including adding, by executing instructions with the at least one processor, web requests that have respective counts of referrers that exceed the adaptive referrer threshold to a set of ones of the plurality of web requests.

12. The method of claim 8, further including removing, by executing instructions with the at least one processor, at least one web request from the plurality of web requests based on a later received web request having a count of referrers that exceeds the adaptive referrer threshold.

13. The method of claim 8, further including removing, by executing instructions with the at least one processor, at least one web request from the plurality of web requests based on a later received web request having a count of referrers exceeding a count of referrers of the at least one web request.

14. The method of claim 8, wherein determining the adaptive referrer threshold includes calculating the adaptive referrer threshold based on a root mean square of the counts of referrers of the at least some of the plurality of web requests.

15. The method of claim 8, wherein the web browser application is executed on a first thread of a first processor of a first device and the instructions are executed on a second thread of the at least one processor of a second device different from the first device.

16. The method of claim 8, further including discarding a second given web request of the plurality of web requests based on determining that a count of referrers of the second given web request does not meet the adaptive referrer threshold.

17. A non-transitory machine readable storage medium comprising instructions, which when executed by at least one processor of a computing system, cause the computing system to perform operations comprising at least:
  logging Hypertext Transfer Protocol (HTTP) data associated with a plurality of web requests associated with a web browser application, wherein the HTTP data indicates, for each of at least some of the plurality of web requests, a referrer corresponding to the web request;
  storing the HTTP data associated with the plurality of web requests for a defined time duration, wherein the HTTP data associated with the plurality of web requests is discarded upon expiration of the defined time duration;
  determining, for each one of the plurality of web requests, a number of referrers corresponding to a count of others of the plurality of web requests for which the referrer is the one of the plurality of web requests based on the HTTP data;
  determining an adaptive referrer threshold for the plurality of web requests based on the numbers of referrers of the plurality of web requests;
  determining that a given web request of the plurality of web requests has a number of referrers that exceeds the adaptive referrer threshold;
  identifying the given web request as a parent web request based on determining that the number of referrers of the given web request exceeds the adaptive referrer threshold; and
  providing a uniform resource locator (URL) of the parent web request.

18. The non-transitory machine readable storage medium of claim 17, wherein the operations further include filtering an additional given web request that has a number of referrers that exceeds the adaptive referrer threshold.

19. The non-transitory machine readable storage medium of claim 18, wherein the additional given web request is filtered based on detecting at least one of an in-page request, a script, a cascading style sheet (CSS) request, or a ping.

20. The non-transitory machine readable storage medium of claim 17, wherein the operations further include:
  identifying a set of ones of the web requests having numbers of referrers that exceed the adaptive referrer threshold; and
  updating the set based on later incoming web requests having a greater number of referrers than the given web request.

21. The non-transitory machine readable storage medium of claim 17, wherein the operations further include discarding HTTP data associated with a web request of the plurality of web requests that has a number of referrers that does not exceed the adaptive referrer threshold.

* * * * *